Feb. 17, 1925.
J. R. GAMMETER ET AL
APPARATUS FOR MANUFACTURING TIRES
Filed Nov. 2, 1922
1,526,594
3 Sheets-Sheet 3
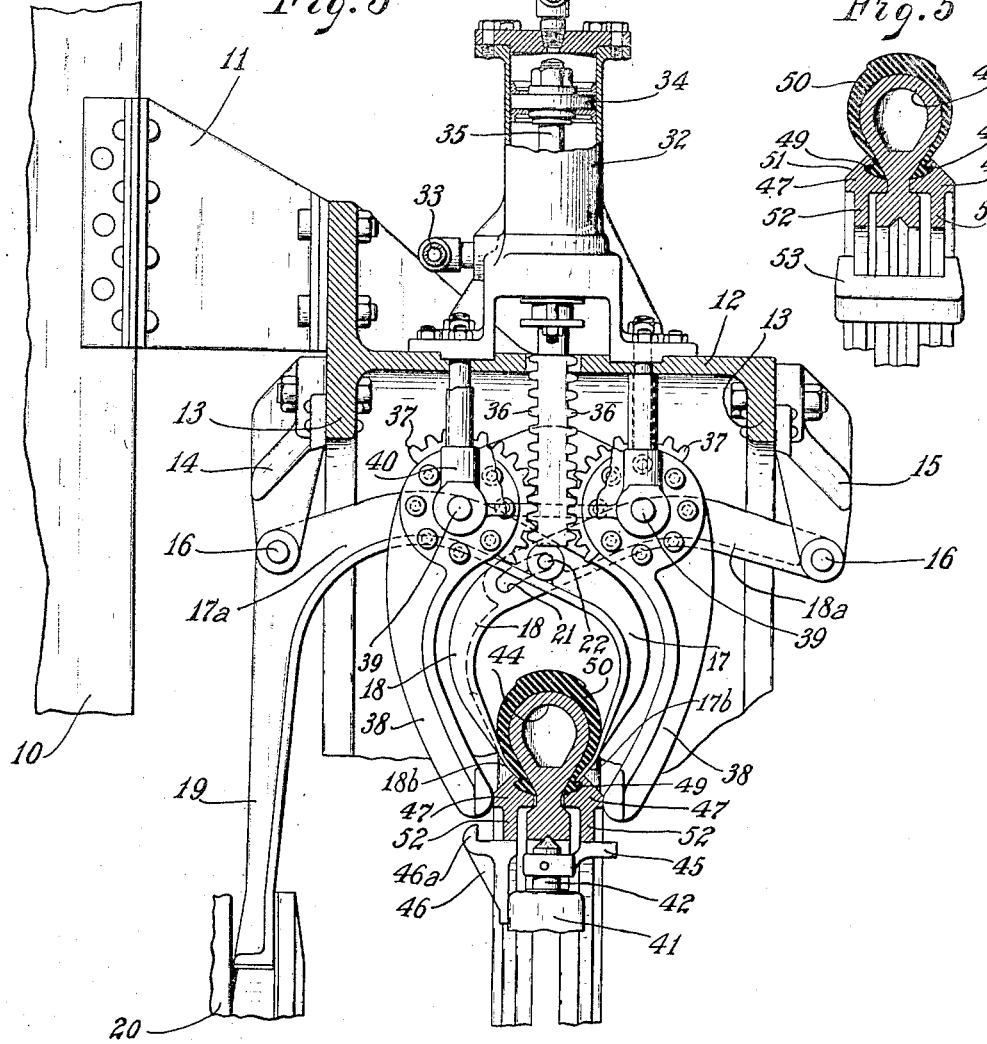
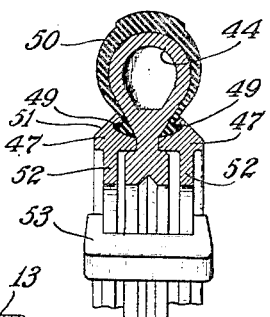
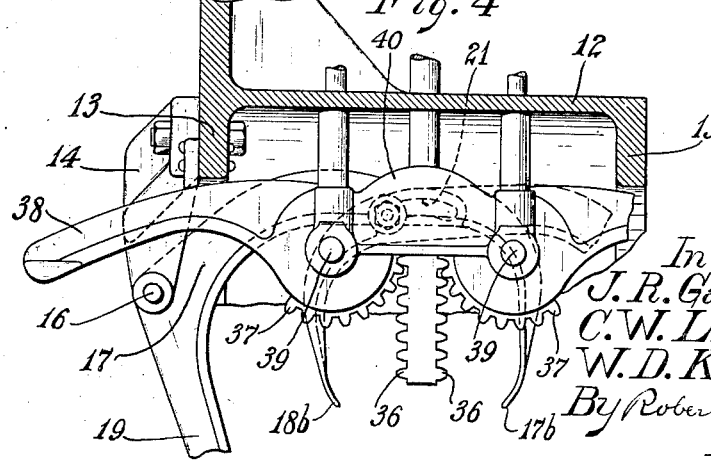
Inventors.
J. R. Gammeter.
C. W. Leguillon.
W. D. Knentt.
By Robert M. Pierson
Atty.

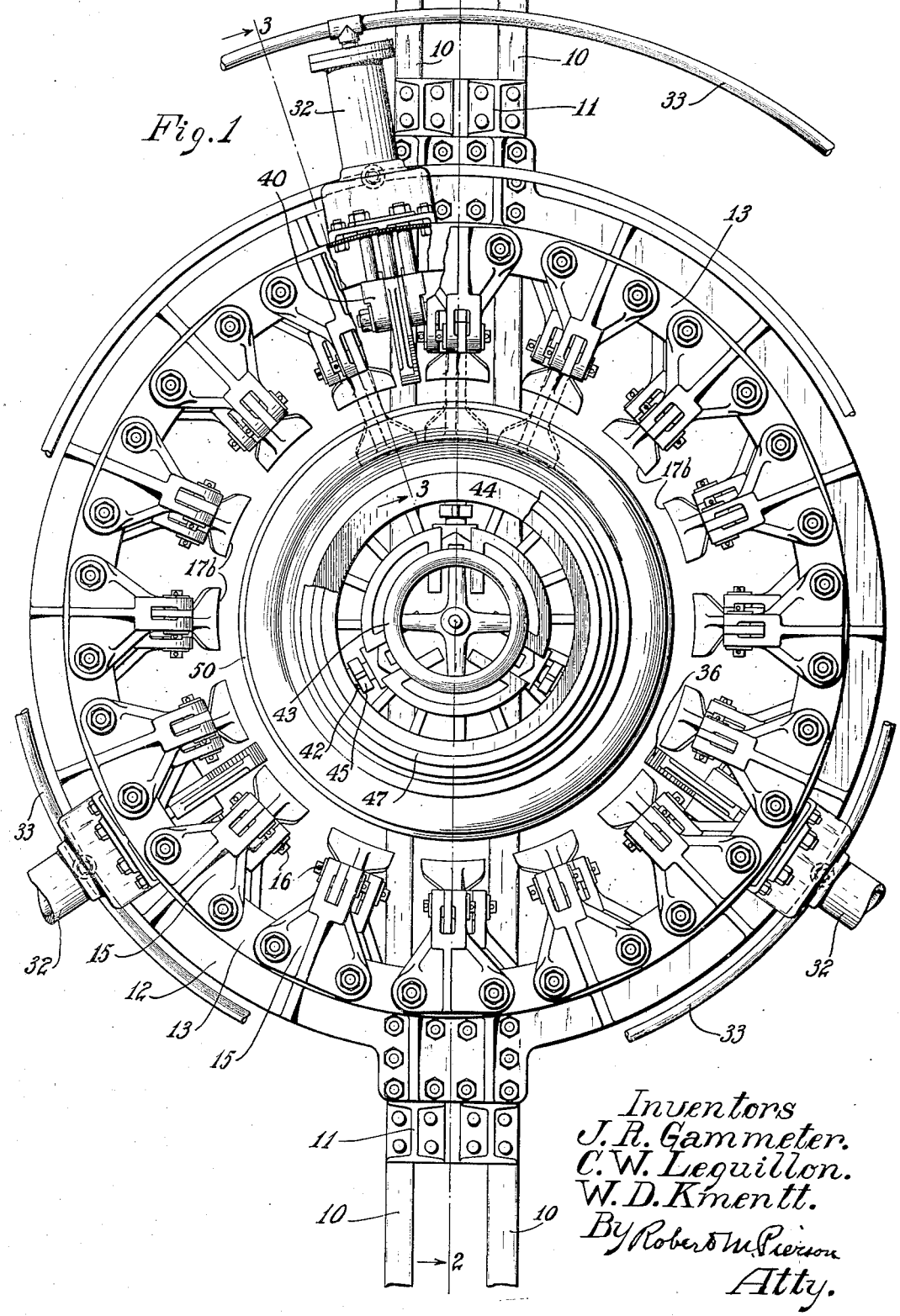

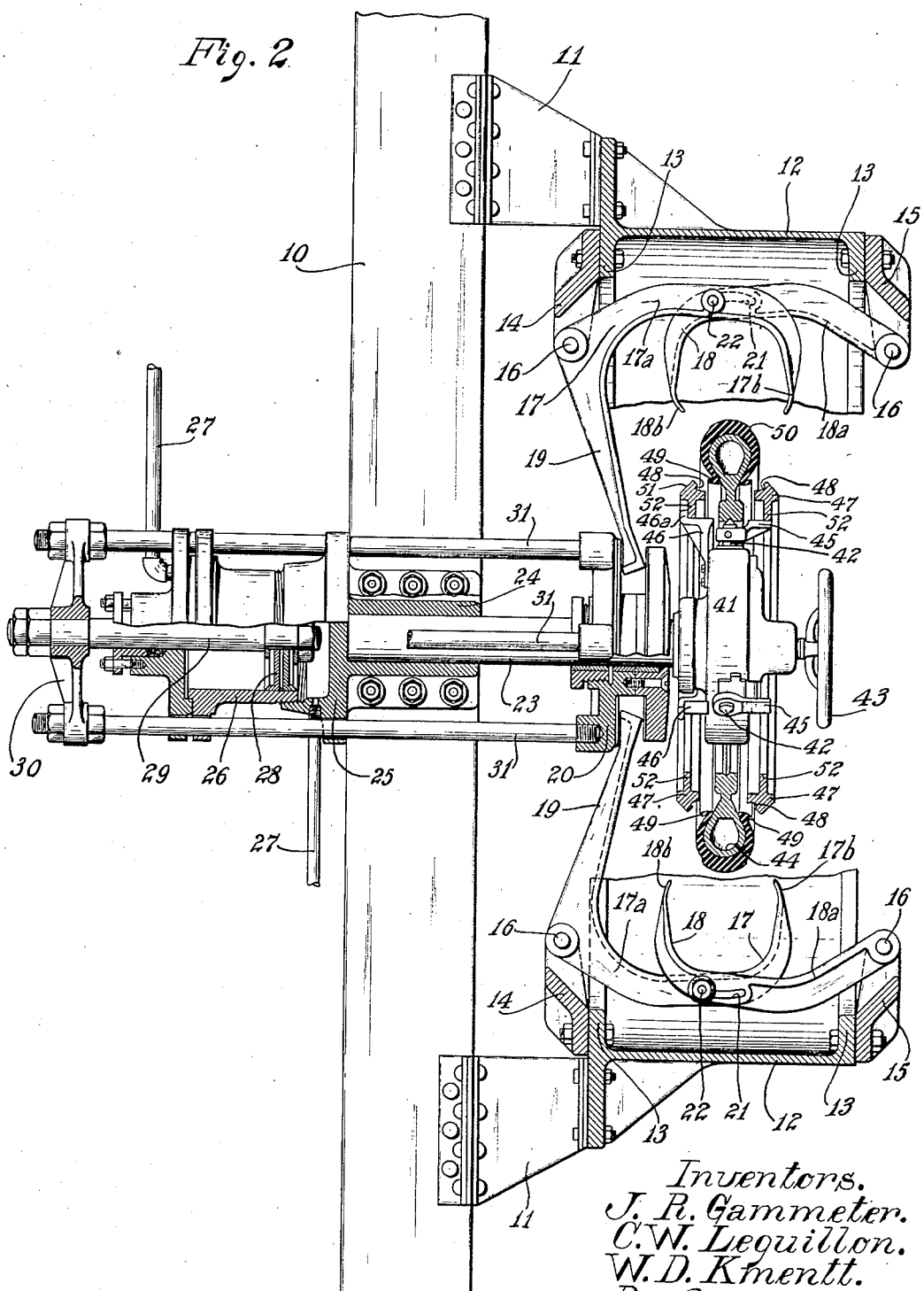

Patented Feb. 17, 1925.

1,526,594

UNITED STATES PATENT OFFICE.

JOHN R. GAMMETER, CHARLES W. LEGUILLON, AND WALDEMAR D. KMENTT, OF AKRON, OHIO, ASSIGNORS TO THE B. F. GOODRICH COMPANY, OF NEW YORK, N. Y., A CORPORATION OF NEW YORK.

APPARATUS FOR MANUFACTURING TIRES.

Application filed November 2, 1922. Serial No. 598,655.

*To all whom it may concern:*

Be it known that we, JOHN R. GAMMETER, CHARLES W. LEGUILLON, and WALDEMAR D. KMENTT, citizens of the United States, residing at Akron, in the county of Summit and State of Ohio, have invented a certain new and useful Apparatus for Manufacturing Tires, of which the following is a specification.

This invention relates to apparatus for use in the manufacture of pneumatic vehicle tires having soft or "clincher" type beads. It is particularly applicable to the building of tires wherein weak-wefted cord fabric is used, in which difficulty has heretofore been encountered in obtaining uniform or sufficient tension or stretch in the fabric plies of the tire during the building thereof. In order to insure sufficient stretch in the fabric plies of the finished tires it has been common practice to build the tire on a rigid core, and then to replace said core with an expansible bag and to distend the bag with a fluid to stretch the tire against the walls of the mold in which it is vulcanized.

The chief objects of our invention are to provide apparatus whereby the fabric plies of a tire may be stretched and put under proper tension after the tire is built but before being placed in a mold, and to obviate the use of expansible bags and permit the tire to be vulcanized on the core on which it is built.

Of the accompanying drawings:

Fig. 1 is a front elevation of a preferred form of our apparatus.

Fig. 2 is a section on the line 2—2 of Fig. 1, showing the tire stretching members in opened-out or inoperative position.

Fig. 3 is a section, on a large scale, on line 3—3 of Fig. 1, showing the apparatus in operative position.

Fig. 4 is a view similar to Fig. 3 showing parts in open or inoperative position.

Fig. 5 is a fragmentary cross-section of a tire, its core, and certain clamping members after removal from the apparatus and ready to be assembled with a vulcanizing mold.

Referring to the drawings, 10, 10 are a pair of upright beams, suitably secured to the floor and ceiling, on which are mounted a pair of brackets 11, 11, supporting at top and bottom a large annular housing 12 mounted in a vertical plane. The lateral edges of the housing 12 are each formed with an inwardly extending circumferential flange 13, 13, and a set of radial, inwardly extending bearing brackets 14, 15 are mounted on the rear and front flanges respectively. The inner ends of said brackets are forked and between their forks are hinged, on pivot pins 16, 16, circumferential sets of levers 17, 17 and 18, 18, respectively, each of the levers 17 being substantially opposite one of the levers 18.

Each of the levers 18 comprises a relatively long and slightly bent portion $18^a$ adjacent its hinge, and its other end portion is more sharply curved toward the center of the device and terminates in a transversely flattened finger $18^b$ having an arcuate edge. Each of the levers 17 has a portion $17^a$ of substantially the same general form as the opposite lever 18, such portion extending from its hinge and crossing said opposite lever 18 and terminating in a flattend finger $17^b$. The levers 17, however, are formed with integral arms 19, 19 extending radially inward from their hinges, the inner ends of said arms being flared and engaged at the front and rear by a pair of annular flanges on an axial slide 20, the function and construction of which will be hereinafter described. In each arm 18 where it is crossed by the arm 17, is an arcuate cam slot 21 in which is slidably and rotatably mounted a stud 22 secured to the lever 17. The shape and position of the slot 21 is such that any movement of the lever 17 will be transmitted to and simultaneously duplicated by the lever 18.

The slide 20 is mounted on a horizontal spindle 23 supported at its rear end in an axial extension 24 projecting from the head 25 of a fluid pressure cylinder 26, said extension being mounted between the beams 10 and constituting the support for the cylinder 26. The cylinder 26 is provided at its opposite ends with fluid supply lines 27, 27 for delivering pressure-fluid to opposite sides of its piston 28, said lines being controlled from a common valve (not shown) and adapted to exhaust one end of the cylinder when pressure is admitted to the other end. The piston rod 29 of said cylinder extends from the rear end thereof and is secured at its outer end to a cross-head 30, and a plurality of rods 31, 31 connect said cross-head with the slide 20, to move it backward or forward as the cylinder 26 is actuated.

Mounted on the outer periphery of the cylindrical housing 12 are several (here shown as three) radially disposed, fluid pressure cylinders 32, 32 each cylinder being connected with common pressure-fluid supply lines 33, 33 for delivering pressure-fluid to opposite sides of their pistons 34. Each piston 34 is provided with a piston rod 35 projecting radially inward through the housing 12 between the levers 17, 18, said piston rod having its inner end formed with integral, oppositely disposed racks 36, 36, facing front and rear, said racks being meshed with gear segments 37, 37 formed on the hubs of a pair of levers 38, 38 pivoted at 39, 39 between a pair of brackets 40, 40, said brackets being secured to the housing 12.

Upon the front end of the spindle 23 is mounted a chuck 41 provided with radial arms 42, 42 which are movable radially by means of a hand wheel 43 and adapted to support an annular ring core such as 44 by engagement with a groove in its inner periphery. Secured to each of the arms 42 is a forwardly extending bracket 45, and rearwardly extending brackets 46, 46, provided with outwardly projecting stops 46ª, 46ª, are mounted on the main body of the chuck 41, said brackets serving as supports for a pair of annular bead clamping rings 47, 47, at the front and rear of the ring core 44. The sides of the bead clamping rings facing the ring core 44 are grooved as at 48, 48 to accommodate the beads 49, 49 of an unvulcanized tire casing 50 built on said core, said bead clamping rings also having tapered or inclined faces 51, 51 (Fig. 5) adapted to fit the mold sections subsequently mounted thereon, and inwardly extending flanges 52, 52, said flanges being adapted to seat upon the brackets 45, 46.

The tire 50 is of special construction, being built with beads of greater circumferential length than required in the finished tire, the side walls being correspondingly narrow and the toes of the beads being substantially nearer the crown of the core than they are to be in the finished tire.

In the operation of our apparatus, the stretching and clamping arms being in the positions shown in Figs. 1, 2 and 4, the rear bead clamping ring 47 is placed, from the front, upon the brackets 46, the stops 46ª preventing it from passing off the rear of said brackets; the ring core 44, with the unvulcanized tire 50 thereon, is placed upon the chuck 41 and secured thereon by turning the hand-wheel 43; after which the front bead clamping ring 47 is placed upon the brackets 45. Pressure fluid is then admitted to the front end of the cylinder 26, forcing its piston 28, the cross-head 30, and the slide 20 rearward, to the left as viewed in Fig. 2. The travel of the slide 20 swings the levers 17 and consequently the levers 18, upon their pivots and causes their fingers 17ᵇ, 18ᵇ, to move in arcuate paths toward the tire 50 until they enter the clinches or grooves of its beads. Continued movement of the fingers forces the beads inward toward the tongue of the core, thus contracting and compressing said beads and stretching the fabric plies of the tire laterally about the core.

While the beads are thus held, pressure fluid is admitted to the inner ends of the cylinders 32, forcing their pistons 34 and the racks 36 radially outward, thus swinging the levers 38 on their pivots and bringing them into the position shown in Fig. 3, against the bead clamping rings 47, forcing them laterally against the tire, and securely clamping its bead portions against the core while the levers 17, 18 hold said beads in contracted position with the fabric of the tire under tension.

Fluid pressure in the cylinder 26 is then reversed, causing the slide 20 to move forward and retract the levers 17, 18 to withdraw their fingers 17ᵇ, 18ᵇ from engagement with the tire beads, the latter being prevented from retracting by the bead clamping rings and the pressure of the levers 38 forcing said bead clamping rings further inward to occupy the space left by the withdrawal of said fingers. The bead-clamping rings are then secured in their clamping position upon the tire, as by U-shaped clips 53, 53 (Fig. 5), adapted to engage the flanges 52, 52, after which the fluid pressure in the cylinders 32 is reversed to restore the levers 38 to the inoperative positions shown in Fig. 4. The tire and core with attached bead clamping rings are then removed from the chuck 11 and the tire vulcanized without removal from the core on which it was built, the tire and core preferably being enclosed in a mold during vulcanization.

Modifications may be resorted to without departing from the scope of our invention and we do not wholly limit our claims to the specific construction herein described.

We claim:

1. In apparatus for manufacturing tires the combination of a tire form, a series of bead engaging members adapted to firmly bear against the respective beads of a preformed tire mounted on said form and to force the beads to position to stretch the tire about said form, and means common to said members for so actuating the same.

2. In apparatus for manufacturing tires the combination of a support, a tire form thereon, circumferential sets of members adapted to enter into the grooves of the respecive beads of a tire mounted on said form and to force the same to position on the form to stretch said tire about said form, and mechanical means common to said members for so actuating them.

3. In apparatus for manufacturing tires, the combination of a core-supporting chuck, a tire-supporting core thereon, a circumferential set of members adapted to firmly press against the respective beads of a tire mounted on said core and to force the same inwardly to stretch the tire about said core, and mechanical means common to said members for so actuating them.

4. In apparatus for manufacturing tires, the combination of a core-supporting chuck, a tire-supporting core thereon, a pair of oppositely positioned arms adapted to engage in the grooves of the beads of a tire mounted on said core and to force the beads inwardly to stretch the tire about said core, and mechanical means common to said arms adapted to cause their bead-engaging portions to move simultaneously and symmetrically with relation to the core to so act upon said beads.

5. In apparatus for manufacturing tires, the combination of a core-supporting chuck, a tire-supporting core thereon, a circumferential set of arms adapted to engage one of the beads of a tire mounted on said core, a circumferential set of arms adapted to engage the other bead of said tire and so mounted and connected with the aforementioned arms as to be compelled to move symmetrically therewith in relation to a median radial plane of said core, and means for so actuating said sets of arms as to cause their bead-engaging portions to force the beads of said tire toward the base of said core and thereby stretch said tire about said core.

6. In apparatus for manufacturing tires, the combination of a core-supporting chuck, a tire-supporting core thereon, a circumferential set of arms hinged at the rear side of the plane of said core, their free ends being adapted to engage and to force inwardly the opposite bead of a tire mounted on said core, a second circumferential set of arms hinged on the front side of the plane of said core, their free ends being adapted to engage and to force inwardly the opposite bead of said tire, and means for simultaneously actuating the arms of said sets in predetermined arcuate paths.

7. In apparatus for manufacturing tires, the combination of a core-supporting chuck, a tire-supporting core thereon, a circumferential set of arms hinged at the rear side of the plane of said core their free ends being adapted to engage and force inward the opposite bead of a tire mounted on said core, a second circumferential set of arms hinged on the front side of the plane of said core, their free ends being adapted to engage and force inwardly the opposite bead of said tire, arms of one set crossing arms of the other set and being connected therewith by a stud and slot connection, arms of one set having actuating portions extending toward the axis of said core from their hinge portions, and common means engaging said actuating portions for driving the bead engaging portions of said arms toward the base of said core to stretch said tire.

8. In apparatus for manufacturing tires, the combination of a core-supporting chuck, a tire-supporting core thereon, a plurality of interconnected arms adapted to engage the beads of a tire mounted on said chuck and force them toward the base of the latter to stretch said tire, means for simultaneously actuating said arms, and means for clamping said beads against the core to hold the tire stretched when said arms are retracted therefrom.

9. In apparatus for manufacturing tires, the combination of a core-supporting chuck, a tire-supporting core thereon, means for forcing the beads of a tire mounted on said core toward the base of the latter to stretch said tire, and a pair of bead clamping rings for clamping said beads against the core to hold the tire stretched.

10. In apparatus for manufacturing tires, the combination of a core-supporting chuck, a tire-supporting core thereon, means for forcing the beads of a tire mounted on said core toward the base of the latter to stretch said tire, a pair of clamping rings adapted to clamp said beads against the core to hold the tire stretched, and means for holding said clamping rings against said beads.

In witness whereof we have hereunto set our hands this 28 day October, 1922.

JOHN R. GAMMETER.
CHARLES W. LEGUILLON.
WALDEMAR D. KMENTT.